United States Patent [19]
Beutel et al.

[11] 3,867,482
[45] Feb. 18, 1975

[54] 2-CHLOROETHANEPHOSPHONIC ACID DERIVATIVES

[75] Inventors: Peter Beutel, Mannheim; Johann Jung, Limburgerhof; Falk Rittig, Dubliner, all of Germany

[73] Assignee: Badische Anilin-& Soda-Fabrik Aktiengesellschaft, Ludwigshafen/Rhine, Germany

[22] Filed: July 24, 1972

[21] Appl. No.: 274,579

[30] Foreign Application Priority Data
Aug. 14, 1971  Germany............................ 2140842

[52] U.S. Cl................. 260/924, 71/86, 260/247, 260/293.51, 260/945, 260/978

[51] Int. Cl............................................... C07f 9/40
[58] Field of Search............................ 260/924, 245

[56] References Cited
UNITED STATES PATENTS
3,507,937   4/1970   Zimmerer .......................... 260/924
3,666,748   5/1970   Honjo et al. ..................... 260/945 X

*Primary Examiner*—Lorraine A. Weinberger
*Assistant Examiner*—Richard L. Raymond
*Attorney, Agent, or Firm*—Johnston, Keil, Thompson & Shurtleff

[57] ABSTRACT

2-chloroethanephosphonic acid derivatives having valuable biological properties and a process for regulating the growth of plants with these compounds.

6 Claims, No Drawings

2-CHLOROETHANEPHOSPHONIC ACID DERIVATIVES

The present invention relates to new derivatives of 2-chloroethanephosphonic acid, agents containing them for regulating the growth of plants, and a process for producing these compounds.

It is known (Dutch patent application No. 6,802,633, French Pat. No. 1,555,173 and British Pat. No. 1,194,433) that 2-chloroethanephosphonic acid has growth regulating properties.

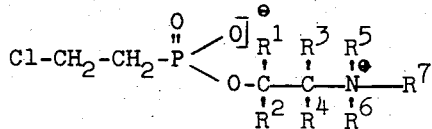

We have now found that compounds of the formula

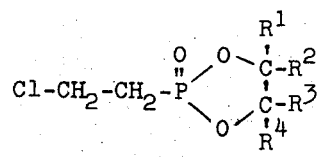

where $R^1$, $R^3$, $R^5$ and $R^6$ each denote hydrogen or lower alkyl (methyl, ethyl);

$R^2$ and $R^4$ each denote hydrogen or lower alkyl of 1 to 4 carbon atoms (methyl, ethyl), aryl (phenyl) or cyclohexyl;

$R^7$ denotes hydrogen; alkyl which may be substituted by $-NH_2$, $-OH$, $-CN$, $-Cl$, $-COOR$, $-CONR^2$, $-OR$ or $-SR$, R denoting lower alkyl and $R^2$ having the meaning given above; aryl (phenyl) or cycloalkyl (cyclohexyl or cyclooctyl);

or $R^6$ and $R^7$ together with the nitrogen atom whose substituent they are denote a pyridine or morpholine ring, have a considerable growth regulating action.

The new compounds are obtained by reacting 2-chloroethanephosphonic acid

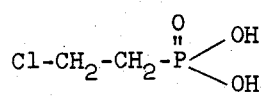

with an aziridine of the formula

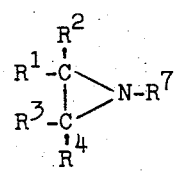

where $R^1$ to $R^7$ have the above meanings:

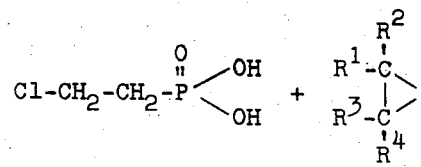

To produce the betaines it is also possible to start from cyclic 2-chloroethanephosphonic esters

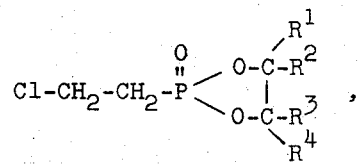

$R^1$ to $R^4$ having the above meanings, and react them with amines in which $R^5$, $R^6$ and $R^7$ have the above meanings:

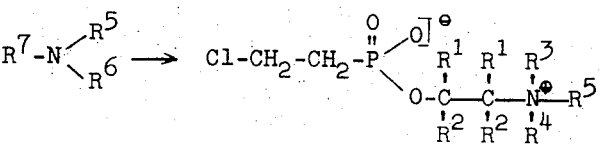

The reaction is advantageously carried out in an inert diluent which, expediently, dissolves the starting component but is a nonsolvent for the end product. Examples of such solvents are benzene and substituted benzenes, e.g., toluene, xylenes, and chlorobenzene; nitriles, e.g., acetonitrile, propionitrile, and butyronitrile; ethers, e.g., diethyl ether and dioxane; hydrocarbons and chlorinated hydrocarbons, e.g., methylene chloride, chloroform, and carbon tetrachloride; and other inert solvents. The reaction may take place within a temperature range of from $-70°$ to $+300°C$, advantageously $-20°$ to $+150°C$, and preferably $-10°$ to $+100°C$.

2-chloroethanephosphonic acid and the 2-chloroethanephosphonic esters, the aziridines and amines are well-known compounds and easily accessible by conventional methods.

Some of the 2-chloroethanephosphonic betaines are hygroscopic, colorless to pale yellow solids which are very easily soluble in water, fairly soluble in lower alcohols annd strongly polar solvents, but difficultly soluble in other organic solvents.

The preparation of the compounds of the invention is illustrated below.

EXAMPLE 1

Slowly and with ice cooling, a solution of 5.7 parts (by weight) of propylenimine in 50 parts of acetonitrile is added to a solution of 14.5 parts of 2-chloroethanephosphonic acid in 100 parts of acetonitrile, A milky emulsion is formed. The solvent is decanted from the settled oil and solvent residues are removed under a water jet vacuum. There is obtained 20.1 parts of the colorless 2-chloroethanephosphonic-0-2-aminopropane betaine melting at 103° to 105°C.

| $C_5H_{13}NPO_3Cl$ (201.5) | | | | |
|---|---|---|---|---|
| C | H | N | P | Cl |
| Calc.: 29.8; | 6.5; | 7.0; | 15.4; | 17.6 |
| Found: 30.9; | 7.1; | 7.1; | 14.7; | 16.9 |

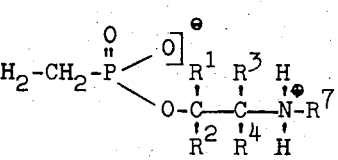

EXAMPLE 2

Over a period of 3 hours and under reflux, a slow gas stream of trimethylamine is passed through a solution of 17 parts of 2-oxo-2-(2-chloroethyl)-1,3,2-dioxaphospholane in 100 parts of absolute benzene until the weight increases by 5.9 parts. After removal of the solvent and volatiles, there remains 18.4 parts (a yield of 80 percent) of 2-chloroethanephosphonic-0-(N-trimethylaminoethane)-betaine as a glassy, viscous, hygroscopic mass.

$N_7H_{17}NPO_3Cl$ (229.5)

|  | C | H | N | P | Cl |
|---|---|---|---|---|---|
| Calc.: | 36.6; | 7.4; | 6.1; | 13.5; | 15.5 |
| Found: | 36.6; | 7.7; | 6.3; | 13.1; | 16.0 |

The following compounds may be prepared in similar manner. Where no melting point could be given, the compounds were clearly identified by their infrared spectra.

| Compound | m.p. (°C) |
|---|---|
| Cl-CH$_2$-CH$_2$-P(=O)(O$^-$)(O-CH$_2$-CH$_2$-NH$_3^+$) | 90 to 91 |
| Cl-CH$_2$-CH$_2$-P(=O)(O$^-$)(O-CH$_2$-CH(CH$_3$)-NH$_3^+$) | 103 to 105 |
| Cl-CH$_2$-CH$_2$-P(=O)(O$^-$)(O-CH$_2$-C(CH$_3$)$_2$-NH$_3^+$) | 142 to 143 |
| Cl-CH$_2$-CH$_2$-P(=O)(O$^-$)(O-CH$_2$-CH(C$_2$H$_5$)-NH$_3^+$) | 106 to 107 |
| Cl-CH$_2$-CH$_2$-P(=O)(O$^-$)(O-CH$_2$-CH$_2$-N(CH$_3$)$_3^+$) | P=O- stretching vibration 1220 cm$^{-1}$; P-O-C- stretching vibration 980 cm$^{-1}$; 1030 cm$^{-1}$ |
| Cl-CH$_2$-CH$_2$-P(=O)(O$^-$)(O-CH$_2$-CH$_2$-NH$_2^+$-CH$_2$-CH$_2$-OH) | P=O- stretching vibration: 1160 cm$^{-1}$; P-O-C- stretching vibration: 1030 cm$^{-1}$; CH$_2$OH- deformation vibration: 1050 cm$^{-1}$; -C-O- stretching vibration: 1320 cm$^{-1}$; -NH$_2^+$- stretching vibration: 2700 cm$^{-1}$ |
| Cl-CH$_2$-CH$_2$-P(=O)(O$^-$)(O-CH$_2$-CH$_2$-NH$_2^+$-CH$_2$-CH$_2$-NH$_2$) | 100 to 105 |
| Cl-CH$_2$-CH$_2$-P(=O)(O$^-$)(O-CH(CH$_3$)-CH(CH$_3$)-NH$_3^+$) |  |
| Cl-CH$_2$-CH$_2$-P(=O)(O$^-$)(O-CH$_2$-CH(cyclohexyl)-NH$_3^+$) |  |
| Cl-CH$_2$-CH$_2$-P(=O)(O$^-$)(O-CH$_2$-CH(phenyl)-NH$_3^+$) |  |

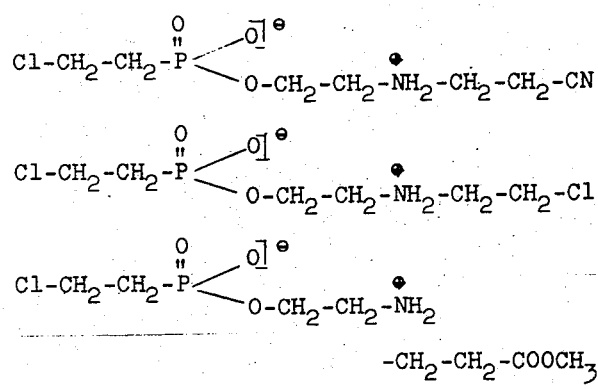

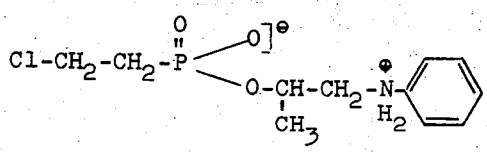

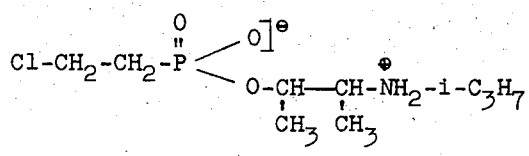

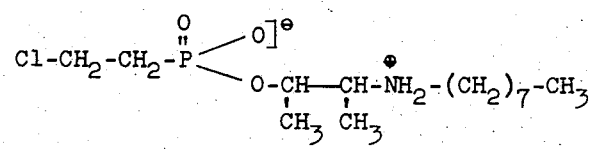

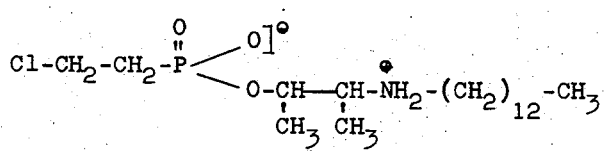

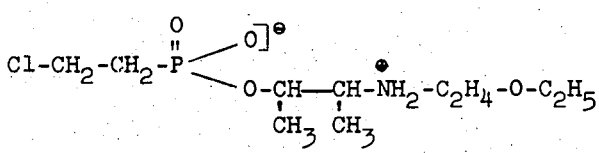

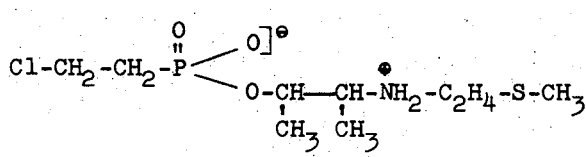

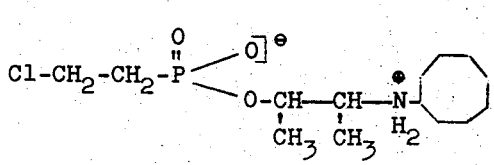

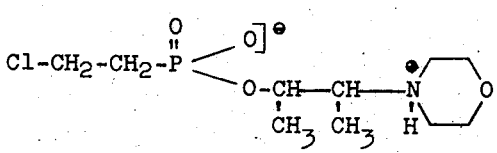

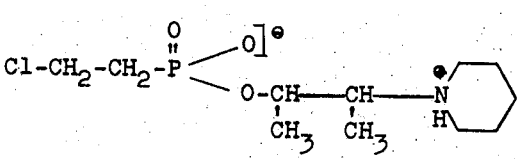

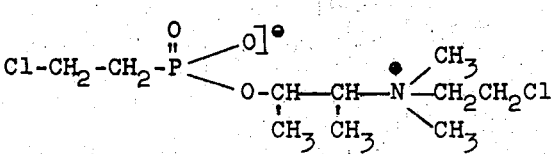

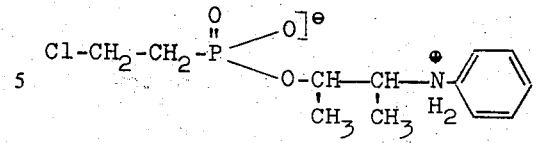

The agents according to the invention may be used as solutions, emulsions, suspensions or dusts or in the form of granules. The form of application depends entirely on the purpose for which the agents are being used; in any case it should ensure a fine distribution of the active ingredient.

For the preparation of solutions to be sprayed direct, water is suitable. However, hydrocarbons having boiling points higher than 150°C, e.g. tetrahydronaphthalene or alkylated naphthalenes, or organic liquids having boiling points higher than 150°C and having one or more than one functional group, e.g. the keto group, the ether group, the ester group or the amide group, this group or these groups being attached as substituent(s) to a hydrocarbon chain or being a component of a heterocyclic ring, may also be used as spray liquids. Natural vegetable oils such as palm-oil may in some cases be suitable.

Aqueous formulations may be prepared from concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g., kieselguhr, talc, clay or fertilizers.

The main characteristic of the new compounds is their intensive stunting action on plants. The measure of the degree of action is first and foremost the reduction in plant height, but other morphological changes are also manifested which are grouped together under the term "epinasty". An epinastic effect is the curling of the leaves round the shoot, and of the shoots round the stem; epinasty may be considered to be a measure of the biological activity of a phosphonic acid derivative.

The reduction in plant height and the extent of epinasty result in other effects such as increased stem formation or tillering, improved rooting, inducing flowering (e.g. bromeliaceae), influencing the time of flowering and hastening ripening (e.g. of tomatoes and vines), and influencing plant metabolism and the production of various plant substances (e.g. stimulation of latex formation in Hevea).

The action of the compounds of the invention is illustrated by the following examples:

EXAMPLE 3

Action of Tobacco Plants

Young tobacco plants of the "Badischer Burley" type were treated under greenhouse conditions and at a growth height of 18 cm with 0.75 kg per hectare of each of the following active ingredients. The height of the plants was measured after 30 days; the superior action of the new compounds is evident from the results contained in the following table. The compatibility of the new compounds is superior to that of the known compound.

| Active ingredient | tobacco plants, leaf treatment | | |
|---|---|---|---|
| | kg/ha | growth height cm | growth height relative |
| untreated | - | 70.0 | 100 |
| 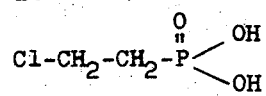 Cl-CH₂-CH₂-P(=O)(OH)(OH) (prior art) | 0.75 | 62.6 | 89 |
| 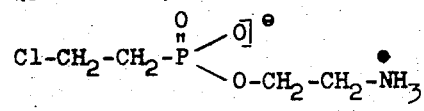 Cl-CH₂-CH₂-P(=O)(O⁻)(O-CH₂-CH₂-NH₃⁺) | 0.75 | 61.3 | 88 |
| 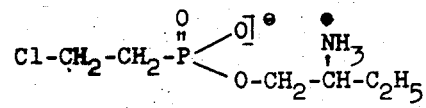 Cl-CH₂-CH₂-P(=O)(O⁻)(O-CH₂-CH(NH₃⁺)-C₂H₅) | 0.75 | 56.6 | 81 |

EXAMPLE 4
Action on Tomato Plants

Tomato plants of the "Eurocross" variety were sprayed to run-off with 1.5 kg per hectare of the active ingredients. When treated, the plants were approximately 15 cm high. After treatment a considerable reduction in growth was observed. The growth height of the plants was measured 16 days after treatment.

EXAMPLE 5
Action on Potato Plants

Cut pieces, i.e., buds cut out from the tuber, were planted in soil in glass dishes (12 cm in diameter) and treated at a growth height of about 8 cm with $2 \times 10^{-2}$ mmoles of active ingredient per dish. During the further period of growth and upon conclusion of the experiment after 21 days it was ascertained that the new growth regulators have a considerable biological action.

| Active ingredient | tomato plants, leaf treatment | | |
|---|---|---|---|
| | kg/ha | growth height cm | growth height relative |
| untreated | - | 58.0 | 100 |
| 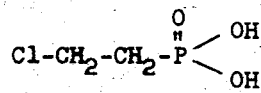 Cl-CH₂-CH₂-P(=O)(OH)(OH) (prior art) | 1.5 | 55.0 | 95 |
| 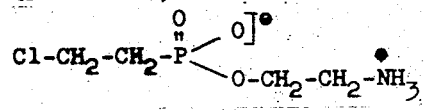 Cl-CH₂-CH₂-P(=O)(O⁻)(O-CH₂-CH₂-NH₃⁺) | 1.5 | 51.0 | 88 |

| Active ingredient | treatment concentration mmoles | growth height cm | relative | degree of epinasty after 14 days |
|---|---|---|---|---|
| control | - | 23.3 | 100 | 0 |
| 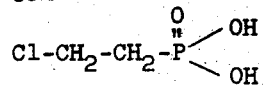 Cl-CH₂-CH₂-P(=O)(OH)(OH) (prior art) | $2 \times 10^{-2}$ | 22.0 | 94 | 6 |
| 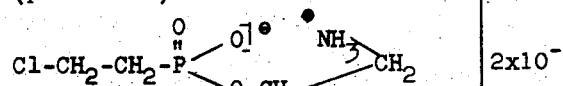 Cl-CH₂-CH₂-P(=O)(O⁻)(O-CH₂-CH₂-NH₃⁺) | $2 \times 10^{-2}$ | 17.4 | 75 | 9 |
| 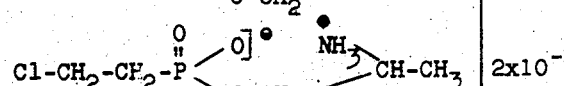 Cl-CH₂-CH₂-P(=O)(O⁻)(O-CH₂-CH(NH₃⁺)-CH₃) | $2 \times 10^{-2}$ | 20.2 | 87 | 8 |
| 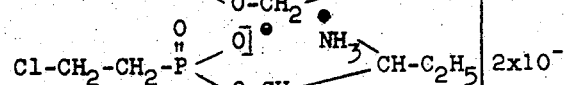 Cl-CH₂-CH₂-P(=O)(O⁻)(O-CH₂-CH(NH₃⁺)-C₂H₅) | $2 \times 10^{-2}$ | 18.4 | 79 | 7 |
| 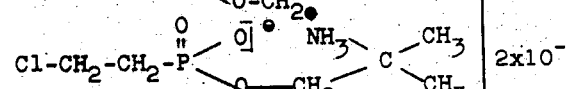 Cl-CH₂-CH₂-P(=O)(O⁻)(O-CH₂-C(NH₃⁺)(CH₃)(CH₃)) | $2 \times 10^{-2}$ | 19.3 | 83 | 8 |

0=no effect
10=greatest degree of epinasty

EXAMPLE 6

Action on Cotton Plants

The leaves of young cotton plants grown under greenhouse conditions in earth in glass dishes were treated with 3 kg per hectare of the active ingredients. In the case of these plants too, a reduction in growth height was observed.

| Active ingredient | Cotton plants, leaf treatment | | |
|---|---|---|---|
| | kg/ha | growth height cm | relative |
| untreated | - | 15.1 | 100 |
| Cl-CH$_2$-CH$_2$-P(=O)(OH)(OH) (prior art) | 3 | 13.5 | 89 |
| Cl-CH$_2$-CH$_2$-P(=O)(O$^-$)(O-CH$_2$-CH$_2$-NH$_3^+$) | 3 | 12.5 | 83 |

EXAMPLE 7

90 parts by weight of the compound of Example 1 is mixed with 10 parts by weight of N-methyl-α-pyrrolidone. A mixture is obtained which is suitable for application in the form of very fine drops.

EXAMPLE 8

20 parts by weight of the compound of Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 9

20 parts by weight of the compound of Example 1 is dissolved in a mixture consisting of 70 parts by weight of water, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 10

3 parts by weight of the compound of Example 1 is intimately mixed with 97 parts by weight of particulate kaolin. A dust is obtained containing 3 percent by weight of the active ingredient.

EXAMPLE 11

30 parts by weight of the compound of Example 2 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A 2-chloroethanephosphonic acid derivative of the formula

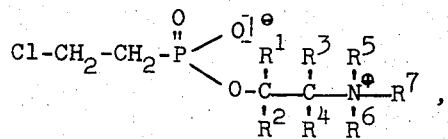

where
$R^1$, $R^3$, $R^5$ and $R^6$ each denote hydrogen or lower alkyl, $R^2$ and $R^4$ each denote hydrogen, lower alkyl, phenyl, or cyclohexyl, $R^7$ denotes hydrogen, phenyl, cyclohexyl, cyclooctyl or alkyl which may be substituted by $-NH_2$, $-OH$, $-CN$, $-Cl$, $-COOR$, $-CONR^2$, $-OR$ or $-SR$, R denoting lower alkyl and $R^2$ having the meaning given above.

2. A 2-chloroethanephosphonic acid derivative as claimed in claim 1 wherein $R^5$, $R^6$ and $R^7$ each denote hydrogen.

3. A 2-chloroethanephosphonic acid derivative as claimed in claim 1 wherein $R^1$, $R^2$ and $R^3$ each denote hydrogen, $R^4$ denotes ethyl and $R^5$, $R^6$ and $R^7$ each denotes hydrogen.

4. A 2-chloroethanephosphonic acid derivative as claimed in claim 1 wherein $R^1$, $R^2$ and $R^3$ each denote hydrogen, $R^4$ denotes methyl and $R^5$, $R^6$ and $R^7$ each denotes hydrogen.

5. A 2-chloroethanephosphonic acid derivative as claimed in claim 1 wherein $R^1$, $R^2$, $R^5$, $R^6$ and $R^7$ each denotes hydrogen, and $R^3$ and $R^4$ each denotes methyl.

6. The compound of the formula

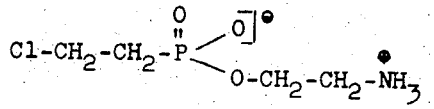

* * * * *